United States Patent [19]
Wallenfang et al.

[11] 3,940,913
[45] Mar. 2, 1976

[54] ROW CROP HARVESTING APPARATUS

[75] Inventors: Jerome A. Wallenfang; Wilmer E. Witt, both of Appleton, Wis.

[73] Assignee: Koehring Company, Milwaukee, Wis.

[22] Filed: May 17, 1973

[21] Appl. No.: 361,129

[52] U.S. Cl. .................. 56/98; 56/14.5; 56/119; 74/231 C
[51] Int. Cl.² .................................. A01D 45/02
[58] Field of Search ....... 56/53, 98, 119, 13.5, 16.9, 56/14.3, 17.4, 14.5, 1; 74/231 C, 217 B

[56] References Cited
UNITED STATES PATENTS

| | | | |
|---|---|---|---|
| 788,270 | 4/1905 | Luce | 56/98 |
| 1,134,451 | 4/1915 | Grove | 56/119 |
| 1,928,868 | 10/1933 | Poen | 56/119 |
| 2,480,209 | 8/1949 | Aasland | 56/119 X |
| 2,571,811 | 10/1951 | Andrews | 56/119 X |
| 3,090,188 | 5/1963 | Gorham | 56/119 X |
| 3,271,940 | 9/1966 | Ashton et al. | 56/119 X |
| 3,338,107 | 8/1967 | Kiekhaefer | 74/231 C |
| 3,460,326 | 8/1969 | Holm | 56/119 |
| 3,492,797 | 2/1970 | Sears | 56/119 X |
| 3,520,120 | 7/1970 | Hardin, Jr. | 56/17.4 X |
| 3,522,693 | 8/1970 | Knapp | 56/1 |
| 3,803,933 | 4/1974 | Huret et al. | 74/217 B |
| 3,854,272 | 12/1974 | Lane et al. | 56/98 X |

Primary Examiner—Hugh R. Chamblee
Assistant Examiner—J. N. Eskovitz
Attorney, Agent, or Firm—Andrew J. Beck

[57] ABSTRACT

A row crop harvesting apparatus adapted to sever forage from a field and deliver it to a crop processing mechanism. The apparatus includes two elongated, laterally opposed conveyor belts which define between them a crop receiving passage. The design of the belts on either side of the crop receiving passage preferably comprises a driving member, a forward idler, and longitudinally spaced intermediate idlers. The idlers are spaced so that idlers of one belt are not laterally aligned with idlers of the other belt. The apparatus includes a rotary cutter mounted and driven by an adjustable forward idler. Means are provided for adjusting the adjustable forward idler. The rotary cutter cooperates with a second cutter element mounted on the means for adjusting the adjustable forward idler, thereby allowing the forward idler to be adjusted without affecting the cutting relationship of the rotary cutter and the second cutter element.

41 Claims, 6 Drawing Figures

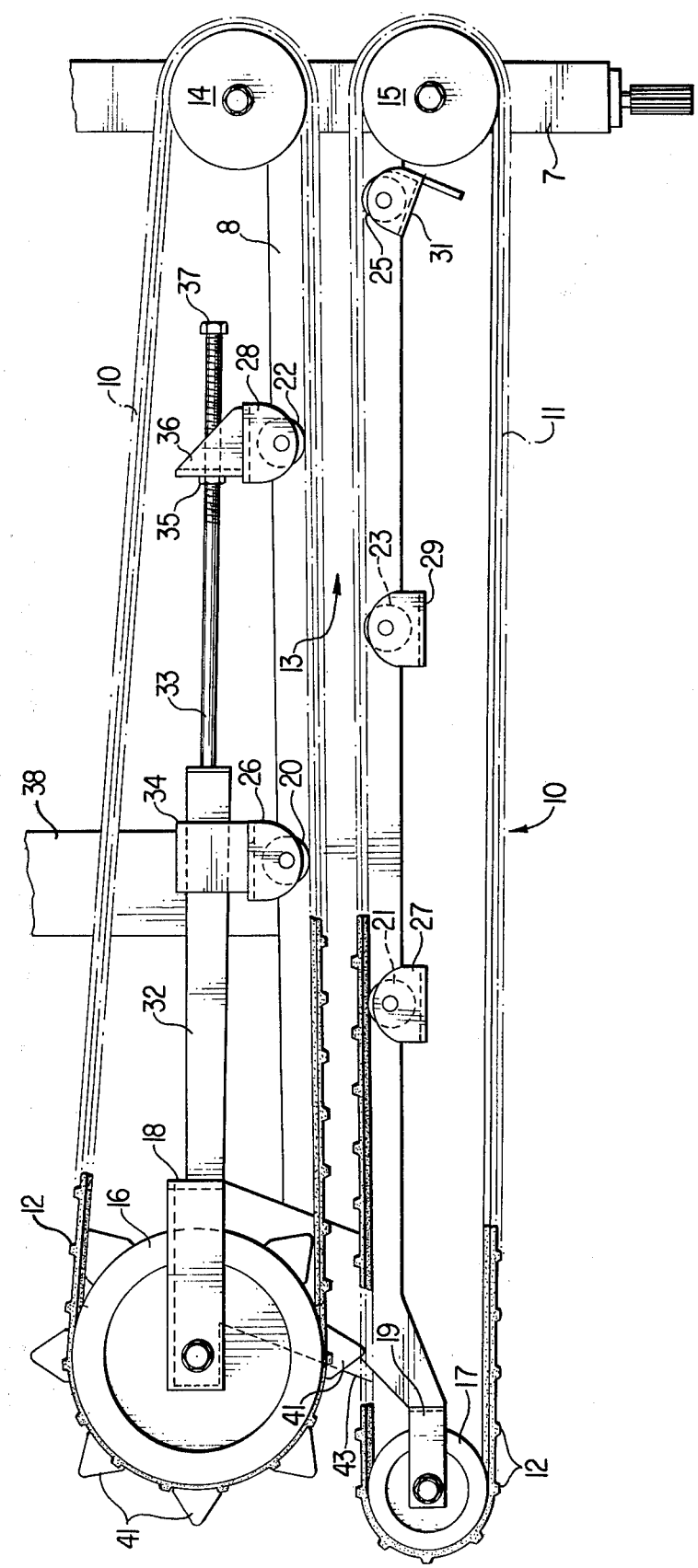

ROW CROP HARVESTING APPARATUS

FIELD OF THE INVENTION

The present invention pertains to a row crop harvesting apparatus. More particularly, the present invention pertains to an apparatus adapted to sever crop material from a field and to convey the severed material to a harvester. The device of the present invention, which may be employed will conventional mobile ensilage harvesters or the like, is particularly suitable for use in harvesting rows of corn.

BACKGROUND OF THE INVENTION

Typical forage harvesters usually embody a portable vehicle adapted to travel down rows of field borne crops. Such devices are equipped with a header attachment for delivering incoming forage to a suitable processing mechanism, which in the case of an ensilage harvester, will comprise suitable chopping and blowing means. The header attachment positioned in front of the processing mechanism, includes means for severing the forage and means for conveying the severed forage to the processing mechanism. Generally, header attachments include a pair of laterally opposed, endless conveyor belts defining between them a forage material receiving passage; the belts are adapted to grip forage and move it through the passage to the processing mechanism. Typically, header attachments also include a conventional oscillating cutting knife or sickle bar for severing the forage material from the field.

The reciprocating sickle employed to sever forage stalks has presented problems in conventional row crop header attachments. A reciprocating sickle is difficult to balance out, in part because of the varying loads imposed upon it. Uneven loading is caused by differences in the size of stalks and differences in resistance to cutting caused by varying condition, such as moisture content and density, of the crop material. In addition, the sickle must change direction twice during each cycle. This involves stopping and starting twice during each cycle to change direction. For these reasons, a reciprocating or oscillating sickle can seldom be completely balanced out. The difficulty in balancing out reciprocating sickles is evidenced by vast numbers of models used, and the frequent modification made to reduce vibration.

Rotary cutters have been employed with row crop header devices for forage harvesters. Desirably, a forward idler wheel for the endless belt conveyor of the header supports and drives the rotating cutter blades which cooperate with a fixed cutter blade. While the use of a rotary cutter obviates problems presented by the use of an oscillating sickle cutter, other problems are presented. To maintain proper tension on the conveyor belt, it is desirable that the forward idler be adjustable. Adjustment of a forward idler, carrying and driving a rotating cutter blade, can adversely affect the relative orientation of the rotating blade and the fixed cutter blade.

In addition to the problems with the severing means, the conveying means of conventional row crop header devices are not as efficient as desirable. Typically, such conveying means involves the use of two cooperating belts composed of steel chain links equipped with crop material engaging lugs. Such chains inefficiently feed the processing mechanism, often become wrapped with the crop material, have a short life, and are noisy during operation. In addition, the design of many current conveying means have little flexibility and do not readily adapt to differences in crop particle size. Oversized material passing through the conveying means can readily choke and jam the mechanism. Excess bulk can also stress components, such as the conveyor frame structure, resulting in misalignment of the cooperating conveyor belts or in breakage of the device.

The row crop harvesting device of the present invention preferably employs a rotary cutter cooperating with a second cutter element. The rotary cutter is supported and driven by a forward idler of the conveying means, which forward idler may be adjusted without affecting the cutting relationship of the rotary cutter and the second cutter element. The conveying means of the row crop harvesting device of the present invention provides for conveying crop material of different sizes without choking or excessively stressing various components. In addition, the design of the row crop harvester of the present invention inherently provides simplicity, ease of maintenance, quiet operation and sturdy construction.

SUMMARY OF THE INVENTION

The present invention provides a row crop harvesting apparatus adapted to sever field borne crop material and convey the crop material to a suitable processing mechanism. The device includes means for severing the crop from a field and means for conveying crop material rearwardly. Preferably, the conveying means comprises at least one forwardly and rearwardly extending endless conveyor belt.

In accordance with one embodiment of the present invention, the conveying means includes at least one conveyor belt in operable contact with an adjustable forward idler and means for adjusting the forward idler forwardly or rearwardly. In accordance with another embodiment of the present invention, means are provided for vertically adjusting the forward idler. In yet another embodiment, means for supporting a forward idler are provided along with means connected to the forward idler for cleaning debris from between the forward idler and the means for supporting the forward idler.

The severing means of the row crop harvesting device of the present invention preferably includes a rotary cutter, supported and driven by an adjustable forward idler of the conveying means. Preferably, the rotary cutter may be in operative cutting relationship with a second cutter element connected to and adjustable with the means for adjusting the forward idler forwardly and rearwardly. As is apparent, it is possible to adjust the position of the forward idler forwardly or rearwardly without affecting the relationship of the rotary cutter and the second cutter element.

Preferably, the conveying means of the row crop header attachment of the present invention includes at least two laterally opposed forwardly and rearwardly extending and rearwardly movable surfaces. The surfaces define between them a crop material receiving passage for conveying the crop rearwardly. The surfaces, which may be formed by elongated, laterally opposed, endless conveyor belts, preferably are each in operable supporting relationship with a plurality of idler members. The idler members along the crop receiving passage are spaced so that no idler member in contact with one of the surfaces is laterally aligned with an idler member in contact with the other of the surfaces. Spacing the idlers so that the idlers of one surface are not directly opposite the idlers of the other surface permits entry into, and passage along, the crop receiving passage of crop material of different sizes and diameters. Oversized chunks of material passing between the surfaces do not choke in a fixed lateral position between the idlers of the opposing surfaces, but rather merely laterally deflect one of the flexible surfaces. In addition, the flexible surfaces permit not only entry of crop material of different sizes, but also permit an irregular grouping of the crop material in the passage without causing undue stressing of the conveying means.

In accordance with an additional embodiment, the means for conveying the crop material rearwardly includes at least one forwardly and rearwardly extending conveyor belt, which conveyor belt includes a plurality of spaced double lugs extending from its inner surface. Each double lug comprises a top lug and a bottom lug and at least one idler member is positioned between the top and bottom lugs in operable supporting relationship with the conveyor belt.

In accordance with a further embodiment of the present invention, the means for conveying crop material rearwardly includes at least one forwardly and rearwardly extending endless conveyor belt, at least one driving member in operable contact with the conveyor belt, a forward idler in operable contact with the conveyor belt, and at least one intermediate idler member. The intermediate idler member is located between the driving member and the forward idler member and is in operable supporting relationship with both the advancing and returning portions of the endless conveyor belt.

BRIEF DESCRIPTION OF THE DRAWINGS

FIG. 3 is a partial top plan view showing a conveying means and severing means of a header apparatus for a row crop harvester constructed in accordance with the teachings of the present invention.

DESCRIPTION OF THE PREFERRED EMBODIMENTS

Figure 1:
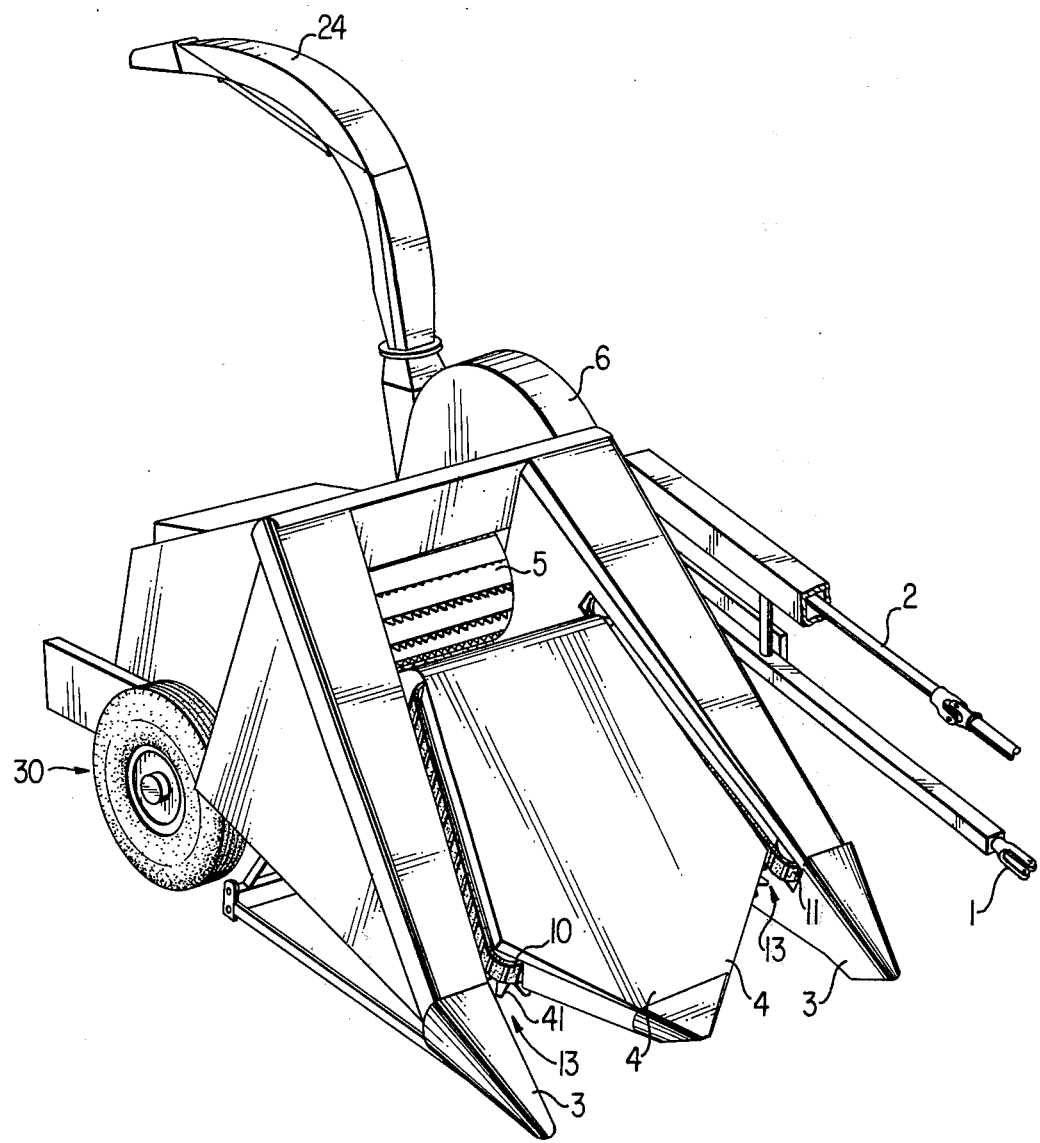
FIG. 1 is a perspective view illustrating a row crop harvesting apparatus embodying the principles of the present invention assembled into operative relationship with a conventional forage harvester.

The row crop harvesting apparatus of the present invention may be employed with forage harvesters and the like. In FIG. 1, by way of example, a pull-type forage harvester incorporating a row crop harvesting apparatus of the type contemplated by the present invention is shown. The device, supported on a wheeled chassis, generally 30, has a conventional hitch 1 for attachment to a tractor or the like, and a conventional power take-off 2 for attachment to a power source on the tractor or the like. Laterally opposed gathering members 3 and 4 define between them crop material receiving passages, generally 13. Crop material passes through crop material receiving passages 13 to feed roll 5. Feed Roll 5 feeds crop material to a cutting means (not shown) within the harvester to reduce or chop the crop material and deliver it rearwardly to a blower mechanism contained within housing 6. The blower mechanism blows the reduced or chopped crop material through spout 24 to a trailer or the like.

Figure 2:
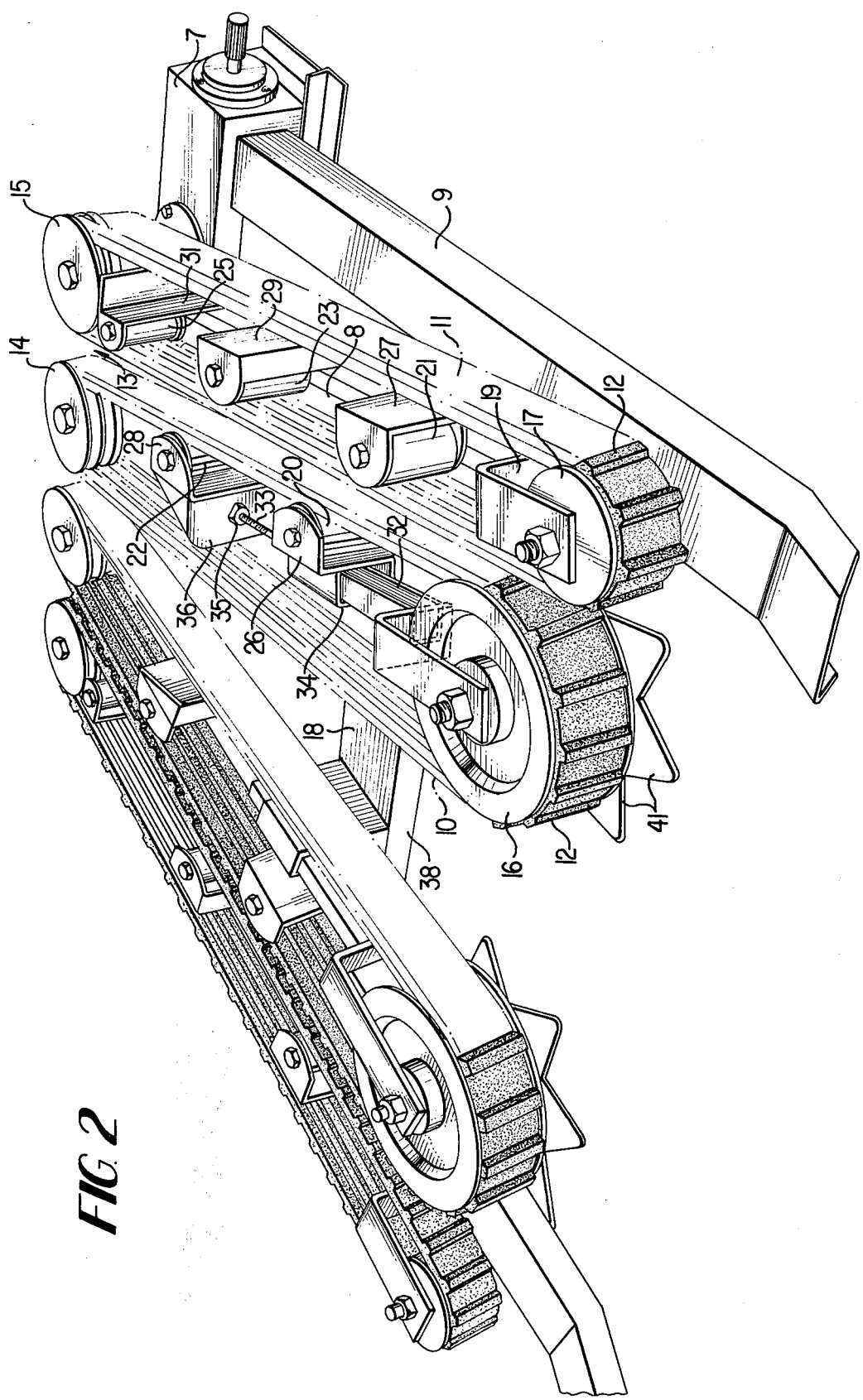
FIG. 2 is a perspective view of the front of a header structure for a row crop harvesting apparatus embodying the features of the present invention.

The row crop forage harvester and header attachment depicted respectively, in FIGS. 1 and 2, includes two laterally disposed conveying means each of which cooperates with a separate severing means. Such attachments are suitable for simultaneously harvesting two rows of forage. It should be appreciated that the row crop harvesters of the present invention may include either a single conveying means and cooperating severing means, or a plurality of conveying means and cooperating severing means.

Figure 5:
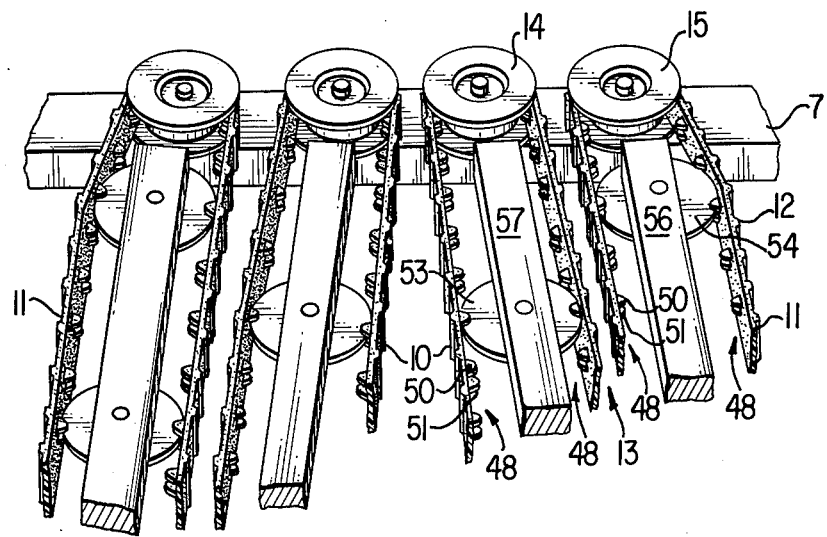
FIG. 5 is a partial top perspective view showing an alternative conveying means embodying the features of the present invention.

The two laterally disposed conveying means and the cooperating severing means of the row crop header apparatus depicted in FIG. 2, are mirror images of each other. Similarly, the two laterally disposed conveying means depicted in FIG. 5 are also mirror images of each other. Accordingly, further description will be made only with reference to the conveying and severing means found on the right-hand side of these figures.

The row crop harvesting apparatus of the present invention includes means for conveying crop material, such as forage, rearwardly. The conveying means may include a frame. In accordance with the embodiment of the invention shown in the drawings, and as best illustrated in FIGS. 2 and 3, the frame comprises a cross member 7, a forwardly extending support 8, and a forwardly extending member 9.

As here embodied, the conveying means includes two rearwardly movable surfaces. The movable surfaces comprise elongated, laterally opposed, endless conveyor belts 10 and 11. The belts preferably include a plurality of regularly spaced traverse lugs 12. It will be appreciated that while the lugs 12 are spaced uniformly along the entire length of the belts, for the purpose of clarity, only a few lugs are illustrated in the drawings. Conveyor belts 10 and 11 may be composed of any suitable material, however, reinforced synthetic rubber or other elastomers are preferred. As embodied, the conveyor belts extend rearwardly and upwardly, defining between them a crop material receiving passage, generally 13.

In the present embodiment, belts 10 and 11 each pass around, in operable contact with, driving members, respectively 14 and 15. Driving members 14 and 15 are mounted on frame cross member 7 and are in turn, operably connected to a conventional driving means (not shown). The driving means is adapted to rotate driving members 14 and 15 in opposite directions so that the driving members cause belts 10 and 11, in the area of the material receiving passage 13, to move towards the driving members.

The conveying means of the row crop harvesting apparatus of the present invention preferably includes at least one adjustable forward idler in operable contact with one of the conveyor belts. In the embodiment illustrated by the drawings, belt 10 passes around adjustable forward idler or pulley 16 mounted in a clevis 18. As embodied, conveyor belt 11 also passes around a forward idler or pulley 17 mounted in clevis 19.

In the embodiment illustrated in FIGS. 2 and 3, belts 10 and 11 are also in operable supporting relationship with intermediate idler members 20, 21, 22, 23, and 25, each of which is mounted in a clevis, respectively, 26, 27, 28, 29, and 31. Each of the clevi is mounted on forwardly extending support member 8. Idler members 20, 21, 22, 23 and 25 are spaces so that no idler member in contact with belt 10 is directly opposite or laterally aligned with an idler member in contact with belt 11.

In accordance with one embodiment of the present invention, means are provided for adjusting the adjustable forward idler forwardly or rearwardly in the longitudinal direction of the crop material receiving passage.

In the embodiment shown in FIGS. 2 and 3, the means for adjusting the forward idler includes a connector bar 32 attached, by conventional means such as welding, to clevis 18. Connector bar 32 abuts against threaded member 33. Threaded member 33 passes through a mating nut member 35 mounted on a support member 36. A bolt head 37 is rigidly attached to threaded member 33. Connector bar 32 is slidably mounted in a yoke 34 which is mounted on a brace member 38.

As here embodied, idler member 16 along with clevis 18, can be adjusted forwardly or rearwardly in the longitudinal direction of material receiving passage 13 by merely turning bolt head 37 in the appropriate direction. Advancing or retracting threaded member 33 through nut member 35 will advance or retract forward idler 16. Advancing or retracting forward idler 16 will affect the tension of conveyor belt 10 which is in contact with forward idler 16.

In accordance with another embodiment of the present invention, means are provided for adjusting the adjustable forward idler vertically relative to the longitudinal direction of the crop material receiving passage.

Figure 6:
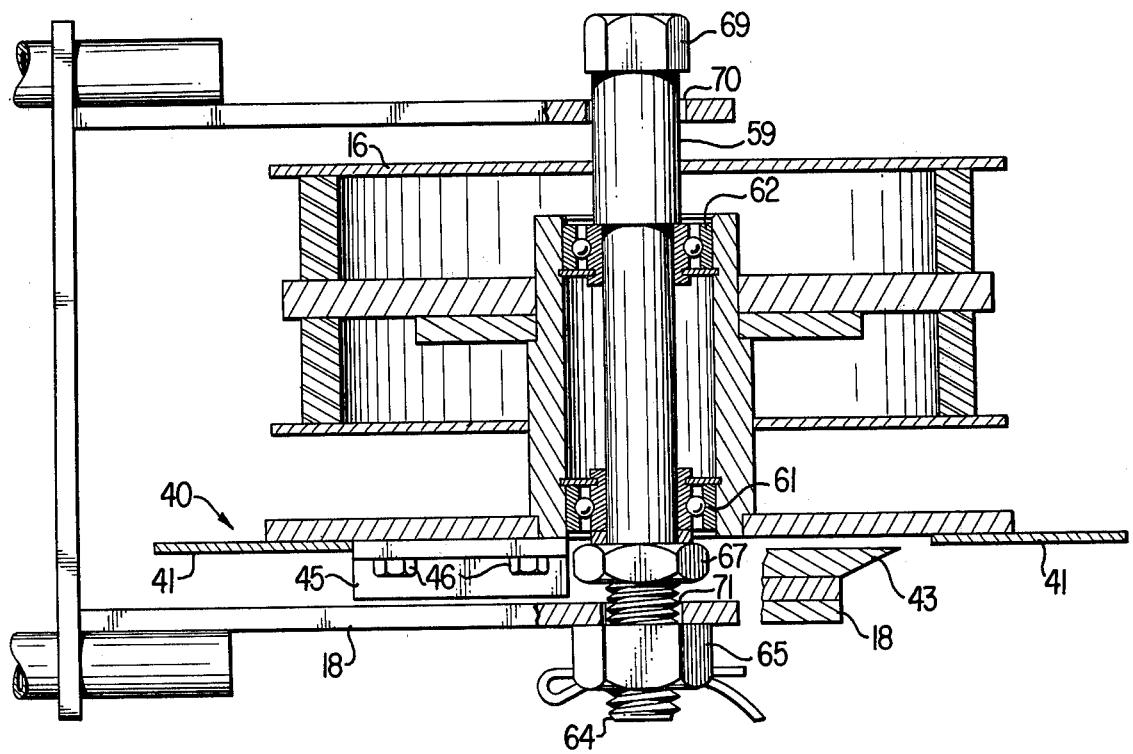
FIG. 6 is a side view, partially in section, showing a forward idler in accordance with a preferred embodiment of the present invention.

In the embodiment shown in FIG. 6, the means for vertically adjusting forward idler 16 includes idler shaft 59, which is connected to idler 16 and passes through openings 70 and 71 in clevis 18. Idler shaft 59 has an adjusting head 69 on its upper end and the lower end of idler shaft 59 has threads 64 which mate with nut 65. Nut 65 is attached to the underside of clevis 18 by conventional means such as welding. Threads 64 also mate with jam nut 67 which serves to lock bearings 61 and 62 of idler 16 to idler shaft 59.

As is apparent, idler 16 may be vertically adjusted upward or downward by merely turning adjusting head 69 in the appropriate direction. Depending upon the direction in which adjusting head 69 is turned, threads 64 either advance into, or retract from, nut 65. Adjustable idler 16 moves vertically upward or vertically downward respectively, with shaft 59 as threads 64 retract from, or advance into, nut 65. As will be pointed out subsequently, vertical adjustment of a forward idler may provide a method of adjusting the severing means.

The conveying means of the row crop harvesting apparatus of the present invention may include at least one intermediate idler member, located between the driving member and a forward idler, which is in operable supporting relationship with both the advancing and returning portions of an endless conveyor belt.

In the preferred embodiment of FIG. 5, the conveying means includes two laterally opposed, endless conveyor belts 10 and 11. Each belt is in operable contact with intermediate idler members. Intermediate idler member 53 is in operable supporting relationship with both the advancing portion (in the area of material receiving passage 13) and the opposite returning portion of conveyor belt 10. Similarly, intermediate idler 54 is in operable contact with both the advancing portion (in the area of passage 13) and the opposite returning portion of conveyor belt 11. Intermediate idlers 53 and 54 are supported at least in part by support members 56 and 57. It will be appreciated that such an embodiment may also employ an adjustable forward idler such as those previously described.

The conveying means of the row crop harvesting device of the present invention may include at least one conveyor belt having a plurality of spaced double lugs extending from the inner surface of the belt.

As embodied in FIG. 5, spaced double lugs, generally 48, extend from the inner surfaces of belts 10 and 11. Each double lug 48 comprises a top lug 50 and a bottom lug 51. Preferably, the top lug and bottom lug are perpendicularly aligned relative to the longitudinal direction of the belts.

To aid in maintaining conveyor belts centered, at least one idler member may be positioned between top and bottom lugs. As here embodied, intermediate idler 53 is positioned between top lugs 50 and bottom lugs 51 of belt 10. Similarly, idler 54 is positioned between lugs 50 and 51 of belt 11. In the illustrated preferred embodiment, idlers 53 and 54 are in operable supporting relationship, between top lugs 50 and bottom lugs 51, with both the advancing and returning portions of belts 10 and 11. It will be appreciated, however, that idlers may be positioned between lugs 50 and 51 which are in operable contact with only the advancing or returning portions of the belts.

The conveying means of yet another embodiment of the present invention include a forward idler, supporting means for the forward idler, and means connected to the forward idler for cleaning debris from between the forward idler and the means for supporting the forward idler.

Figure 4:
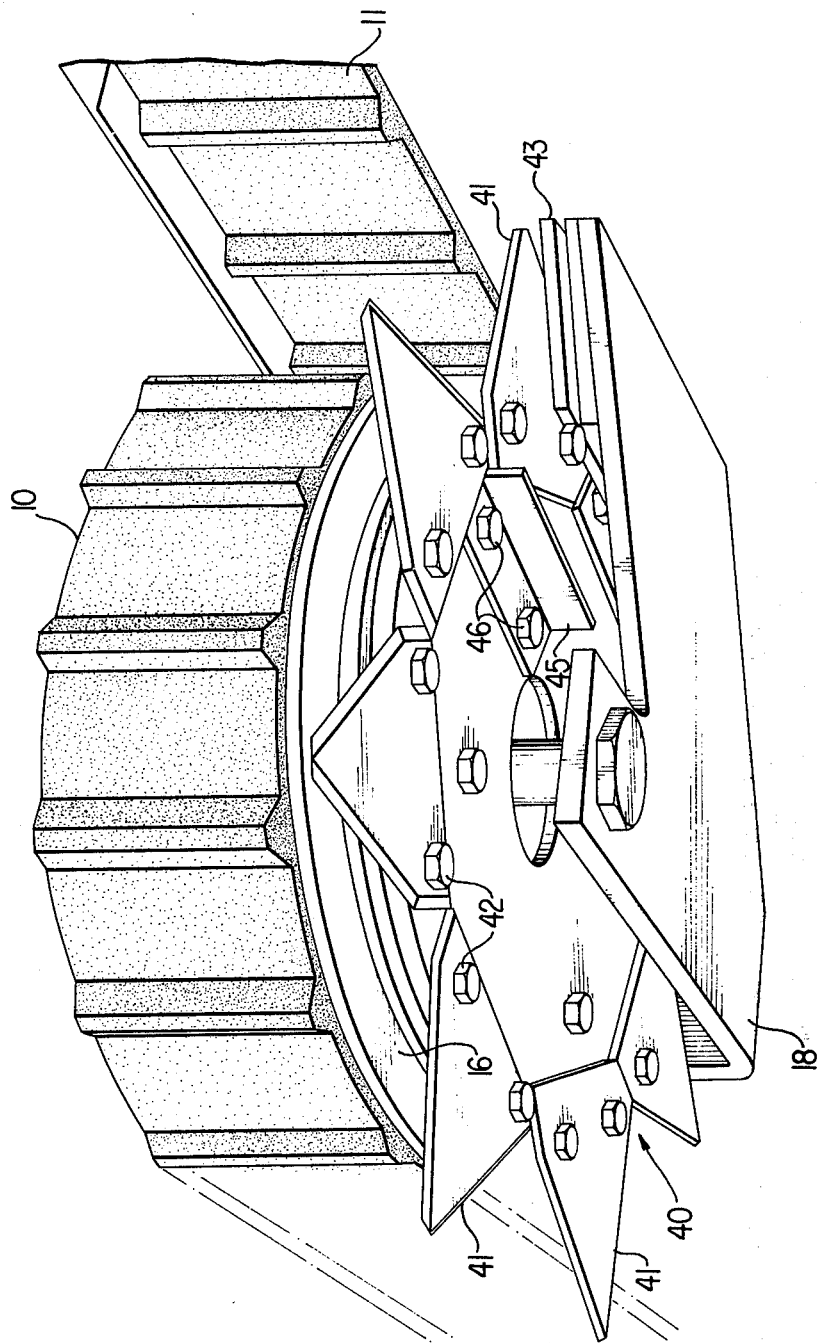
FIG. 4 is a partial bottom perspective view showing details of a severing means within the scope of the present invention.

In the embodiment depicted in FIGS. 4 and 6, the means for cleaning debris from between the forward idler and the means for supporting the forward idler comprises an L-shaped cleaning member 45. Cleaning member 45 is connected to the underside of idler 16 by conventional means such as bolts 46. The means for supporting idler 16 includes clevis 18. As is apparent, cleaning member 45 sweeps debris from between the underside of the idler 16 and clevis 18 on each revolution of idler 16. L-shaped cleaning member 45 is preferably positioned for easy replacement and formed from an inexpensive mild steel. Cleaning member 45 prevents the area between clevis 18 and idler 16 from becoming choked with weeds and other debris.

The row crop harvester of the present invention also includes means for severing crop material from a field. In accordance with preferred embodiments, the severing means is located at the forward end of the crop material receiving passage and includes a rotary cutter, supported and driven by an adjustable forward idler. The rotary cutter may be in operative cutting relationship with a second cutter element which is connected to and adjustable with the means for adjusting the adjustable forward idler forwardly and rearwardly.

In accordance with one embodiment of the present invention, and as shown in FIGS. 3, 4, and 6, a rotary cutter generally 40, is directly attached to forward idler 16, by conventional means such as bolts. As here embodied, the rotary cutter comprises a plurality of cutting blades 41 mounted on the underside, and extending beyond the periphery of idler 16. The cutting blades 41 may be directly mounted on idler 16 by conventional means such as bolts 42. As here embodied, the rotary cutter cooperates with a fixed blade 43, mounted on and adjustable with clevis 18. As the cutting blades 41 move into cutting relationship with fixed blade 43, forage stalks are sheared off between the edges of the blades. The heel of the entering cutting blade 41 contacts the fixed blade 43 before the tip of the cutting blade 41 leaves fixed blade 43. This prevents jamming of the rotating cutter into fixed blade 43.

It will be appreciated that either or both of forward idlers 16 and 17 could be made adjustable and adapted to support and drive a rotary cutter. Preferably, one forward idler is located rearwardly of the other. By placing one forward idler rearwardly of the other, gathering of forage material is facilitated and choking of the material receiving passage with forage between the two forward idlers is avoided. In the embodiment of the drawings, the rearward forward idler supports and drives the rotary cutter. Such an arrangement insures gripping of forage in the material receiving passage immediately upon severing. It is also preferred that the rotary cutter extend forwardly of the frame of the row crop harvesting apparatus. A forwardly extending rotary cutter assists in gripping and gathering row crop material.

In operation, the row crop harvesting apparatus of the present invention may be mounted to a movable forage harvester adapted to travel down rows of forage. In the embodiment shown in the figures, drive members 14 and 15 are connected to suitable driving means. As viewed in FIGS. 2 and 3, driving member 15 is rotated in, and drives belt 11 in a clockwise direction. Drive member 14 rotates in, and drives belt 10 in a counterclockwise direction. Forward idler 16 is in turn, driven by belt 10 in a counterclockwise direction. Forward idler 16 drives cutter blades 41 in a counterclockwise direction and into cooperative severing relationship with fixed blade 43. Forward idler 16 also drives cleaning member 45 through the area between the bottom of idler 16 and the upper interior surface of clevis 18 (including the portion of clevis 18 which supports fixed cutter blade 43.).

As the row crop header here embodied moves down a row of field borne forage material, stalks of forage material are gathered by the combined action of belt 11 in the area of idler 17, and by cutting blades 41. The stalks are brought into the forward end of forage material receiving passage 13 where they are severed from the ground by the cooperative action of cutter blades 41 and fixed blade 43. The severed stalks are gripped in forage material receiving passage 13 between belts 10 and 11 immediately upon being severed from the ground. Any debris collecting between the underside of rotary cutter 40 and clevis 18 is removed by rotating cleaner member 45. The severed forage is conveyed rearwardly and upwardly into the area of driving members 14 and 15 where it is delivered to an ensilage harvester or to other suitable mechanisms for further processing.

In accordance with the preferred embodiment of the present invention, whereby the various idlers such as intermediate idlers 20, 21, 22, 23, and 25 (FIGS. 2 and 3) or 53 and 54 (FIG. 5) are placed so that no idler member in contact with belt 10 is directly opposite an idler member in contact with belt 11, forage material of different sizes and diameters is readily passed through the forage material receiving passage 13. The oversized material in passage 13 does not choke in a fixed lateral position between idlers of the opposing belts. Rather, at every point in which one belt is in contact with an idler, the other belt is free to laterally deflect.

In accordance with certain embodiments of the present invention, it is possible, if desired, to readily change the tension in at least one of the conveyor belts, as to prevent slippage or to effect gripping of forage in the forage material receiving passage, without affecting the cutting relationship of the rotary cutter, and the second cutter element. For example, in the embodiment of the invention shown FIGS. 2 and 3, tension in belt 10 can be increased by merely turning bolt head 37 in the appropriate direction to cause threaded member 33 to advance through nut member 35. Movement of threaded member 33 forward will cause connector bar 32 to move forward which will in turn, cause clevis 18 and idler 16 to move forward, thus increasing tension in belt 10. To decrease tension, it is merely necessary to turn bolt 37 in the opposite direction. Since rotary cutter 40 and idler 16 move simultaneously with clevis 18 and fixed cutter blade 43, adjustment of idler 16 forwardly or rearwardly does not affect the cutting relationship between rotary cutter 40 and fixed cutter blade 43.

In accordance with another embodiment of the present invention, it is possible, if desired, to readily adjust the vertical relationship between the rotary cutter and the second cutter element. For example, in the embodiment shown in FIG. 6, the relative vertical positions of rotary cutter 40 and fixed cutter blade 43 can be adjusted by merely turning adjusting head 69 in the appropriate direction to cause threads 64 to either advance through or retract from nut 65. Movement of threads 64 through nut 65 will cause idler shaft 59 and idler 16 to move upwardly or downwardly. Rotary cutter 40, supported by, driven by, and adjustable with forward idler 16, will also move upwardly or downwardly. Such motion is relative to clevis 18, which supports both idler 16 and fixed cutter blade 43. Accordingly, vertical movement of idler 16 affects the relative position of rotary cutter 40, including cutter blades 41, and fixed cutter blade 43. In this manner, cutter blades 41 and fixed cutter blade 43 may be readily and precisely vertically adjusted so that they are in proper vertical cutting relationship. The means for vertically adjusting idler 16 provide a simple means of adjustment to compensate for wear of cutting blades 41 and fixed cutter blade 43.

The invention in its broader aspects is not limited to the specific details shown and described, and departure from such details may be made without departing from the principles of the invention and without sacrificing its principal advantages.

What is claimed is:

1. In a row crop harvesting apparatus having means including at least one forwardly and rearwardly extending endless conveyor belt for conveying the crop rearwardly and means for severing the crop from a field, the improvement comprising an adjustable forward idler in operable contact with said conveyor belt, said means for severing the crop including a rotary cutter operating coaxially with said adjustable forward idler, means for adjusting said forward idler forwardly and rearwardly while maintaining the relative orientation of said forward idler and said severing means, and means for rotating said rotary cutter.

2. The row crop harvesting apparatus of claim 1 in which said means for adjusting said forward idler includes a clevis supporting said forward idler, said rotary cutter being supported by and adjustable with said clevis.

3. The row crop harvesting apparatus of claim 1 also including a plurality of spaced double lugs, each of said double lugs comprising a top lug and a bottom lug extending from the inner surface of said converyor belt, a rearward driving pulley, said belt being partially supported by said forward idler and said driving pulley, and at least one idler member spaced from the forward idler and rearward pulley and positioned between top and bottom lugs in operable supporting relationship with at least a portion of said conveyor belt.

4. The row crop harvesting apparatus of claim 3 in which top and bottom lugs are perpendicularly aligned relative to the longitudinal direction of said belt.

5. The row crop harvesting apparatus of claim 3 in which said at least one idler member is positioned between top lugs and bottom lugs in operable supporting relationship with both the forwardly and rearwardly extending portions of said endless conveyor belt.

6. The row crop harvesting apparatus of claim 1 also including a fixed cutter in cutting relationship with said rotary cutter and wherein the means for adjusting the forward idler permits adjustment of belt tension without affecting the cutting relationship of the rotary and fixed cutter and ensures that the crop will be gripped by said belt immediately upon severance.

7. The row crop harvesting apparatus of claim 1 including means for supporting said forward idler and wherein said severing means also includes a cutter element mounted on said supporting means and adjustable forwardly and rearwardly simultaneously with said forward idler and said rotary cutter.

8. A crop harvesting apparatus having means for severing a crop from a field and means including at least two laterally opposed forwardly and rearwardly extending conveyor belts having substantially parallel rearwardly movable surfaces defining between them a crop receiving passage for conveying the crop rearwardly, the improvement comprising a pair of forward idlers, one forward idler being in supporting relationship with each belt, a plurality of intermediate idler members spaced rearwardly from said forward idlers, in operable supporting relationship with each of said belts, one of said forward idlers being located forwardly of the other forward idler for establishing an extended portion of one of said substantially parallel rearwardly movable surfaces of said belts, the length of said extended portion including at least the projection of the diameter of the other of said pair of idlers, and wherein said severing means includes a rotary cutter, said extended portion being laterally opposed to said rotary cutter, said intermediate idler members along the crop receiving passage being spaced so that no intermediate idler member in supporting relationship with one belt is laterally aligned with an intermediate idler member in supporting relationship with the other of said belts.

9. The crop harvesting apparatus of claim 8 including means for adjustably moving at least one of said forward idlers forwardly and rearwardly while maintaining the relative orientation of the adjusted forward idler and said severing means.

10. The crop harvesting apparatus of claim 9 in which one adjustable forward idler supports and drives said rotary cutter.

11. The row crop harvesting apparatus of claim 8 also including a pair of rearward pulleys a forward idler and one of said rearward pulleys being respectively in operable contact with the forward and rearward end of each belt, each said conveyor belt including a plurality of longitudinally spaced double lugs extending from the inner surface thereof, each double lug comprising transversely spaced first and second lugs, and at least one idler between said forward idler and rearward pulley positioned between said first and second lugs for supporting portions of said belt and maintaining said belts in alignment with respect to each other to ensure forming said receiving passage and conveying crop material rearwardly.

12. The apparatus defined in claim 11 in which said at least one idler is in operable supporting relationship with both the forwardly and rearwardly extending moving portions of each belt.

13. A crop harvesting apparatus having means for severing a crop from a field and means including at least two laterally opposed forwardly and rearwardly extending and rearwardly movable surfaces defining between them a crop receiving passage for conveying the crop rearwardly, the improvement comprising a plurality of idler members in operable supporting relationship with each of said opposed surfaces, which idler members along the crop receiving passage are spaced so that no idler member in supporting relationship with one opposed surface is laterally aligned with an idler member in supporting relationship with the other of said surfaces, and at least one movable surface comprises an endless conveyor belt, which has a plurality of spaced double lugs, each double lug comprising a top lug and a bottom lug, extending from the inner surface of said conveyor belt and in which at least one of said idler members along said crop receiving passage is positioned between top lugs and bottom lugs in operable supporting relationship with both the forwardly and rearwardly extending portions of said endless conveyor belt.

14. In a row crop harvesting apparatus having means for severing the crop from a field and means including at least two laterally opposed forwardly and rearwardly extending and rearwardly movable surfaces defining between them a crop material receiving passage for conveying the crop rearwardly, the improvement comprising a forward idler in supporting relationship with each of said surfaces, said forward idlers including a pulley and shaft, one of which forward idlers is located rearwardly of the other, said means for severing the crop including a rotary cutter supported and driven by the rearwardly located forward idler and a second cutter element mounted in cooperating cutting relationship with said rotary cutter.

15. The row crop harvesting apparatus of claim 14 in which the forward idler which supports said rotary cutter is adjustable and which includes means for adjusting said rearwardly located forward idler forwardly and rearwardly without affecting the relative orientation of said rearwardly located idler and said rotary cutter.

16. The row crop harvesting apparatus of claim 14 which includes a plurality of idler members in operable contact with each of said laterally opposed movable surfaces and in which idler members along the crop material receiving passage are spaced so that no idler member in contact with one of said surfaces is laterally aligned with an idler member in contact with the other of said surfaces.

17. A row crop harvesting apparatus for severing and conveying crop material, said apparatus comprising:
   A. a frame;
   B. means attached to said frame for conveying crop material rearwardly, comprising:
      1. at least two elongated, laterally opposed, endless conveyor belts, defining between them a crop material receiving passage, said belts arranged to convey severed crop material rearwardly through said passage;
      2. an adjustable forward idler in operable contact with at least one of said conveyor belts;
      3. means for adjusting said forward idler forwardly and rearwardly in the longitudinal direction of the crop material receiving passage; and
   C. means located at the forward end of said crop material receiving passage for severing crop from a field comprising:
      1. a rotary cutter, supported and driven by said forward idler, in operative cutting relationship with
      2. a second cutter element connected to and adjustable with said means for adjusting said forward idler, whereby adjustment of said forward idler does not affect the relationship of said rotary cutter and said second cutter element.

18. The row crop harvesting apparatus of claim 17 wherein said rotary cutter extends forwardly of said frame.

19. The row crop harvesting apparatus of claim 18 in which said adjustable forward idler is adjustable forwardly and rearwardly without affecting the relative orientation and cutting relationship between said rotary cutter and said forward idler.

20. The row crop harvesting apparatus of claim 19 in which said conveyor belts extend rearwardly and upwardly.

21. The row crop harvesting apparatus of claim 19 in which said conveyor belts are flexible.

22. The row crop harvesting apparatus of claim 19 in which said means for adjusting said forward idler includes a clevis in which said forward idler is mounted and in which said second cutter element is mounted on and adjustable with said clevis.

23. The row crop harvesting apparatus of claim 19 in which the conveying means includes a plurality of idler members in operable contact with each of said belts and in which idler members along the crop material receiving passage are spaced so that no idler member in contact with one of said belts is laterally aligned with an idler member in contact with the other of said belts.

24. The row crop harvesting apparatus of claim 19 in which said rotary cutter comprises at least one cutting blade attached to the underside, and extending beyond the periphery of said forward idler.

25. The row crop harvesting apparatus of claim 24 in which said rotary cutter comprises a plurality of cutting blades.

26. The row crop harvesting apparatus of claim 19 in which each of said belts is in contact with a forward idler, one of which forward idlers located rearwardly of the other supports and drives said rotary cutter.

27. The row crop harvesting apparatus of claim 19 including a plurality of said means attached to said frame for conveying crop material rearwardly and a plurality of said means located at the forward end of each crop material receiving passage, for severing crop from a field.

28. The row crop harvesting apparatus of claim 19 which includes means for vertically adjusting said adjustable forward idler.

29. The row crop harvesting apparatus of claim 19 which includes means for supporting said adjustable forward idler and means connected to said forward idler for cleaning debris from between said forward idler and said means for supporting said forward idler.

30. The row crop harvesting apparatus of claim 19 in which a plurality of spaced double lugs, each double lug comprising a top lug and a bottom lug, extend from the inner surface of at least one of said conveyor belts, and in which at least one idler member is positioned between top and bottom lugs in operable supporting relationship with said at least one of said conveyor belts.

31. The row crop harvesting apparatus of claim 30 in which at least one idler member is positioned between top lugs and bottom lugs in operable supporting relationship with both the forwardly and rearwardly extending portions of said endless conveyor belt.

32. In a row crop harvesting apparatus having means including at least one forwardly and rearwardly extending endless conveyor belt for conveying crop material rearwardly, a forward idler in operable contact with said conveyor belt, a rotary cutter operatively associated with the bottom of said forward idler, and means for supporting said forward idler the improvement comprising means connected to the bottom surface of said rotary cutter and movable with said forward idler for cleaning debris from between said forward idler and said means for supporting said forward idler.

33. The row crop harvesting apparatus of claim 32 in which said means for cleaning debris comprises a member extending downwardly from said bottom surface of said rotary cutter and radially outward from the axis of rotation of said forward idler, whereby debris is swept from the space between the bottom surface of said rotary cutter and the support for said forward idler upon rotation of said forward idler.

34. The row crop harvesting apparatus of claim 33 in which said forward idler is adjustable.

35. In a row crop harvesting apparatus having means including at least one forwardly and rearwardly extending endless conveyor belt for conveying the crop rearwardly and means for severing the crop from a field, the improvement comprising an adjustable forward idler in operable contact with said conveyor belt, means for supporting said forward idler, said means for severing the crop from a field includes a rotary cutter and a cutter element which cooperates with said rotary cutter, said rotary cutter being operatively associated with said adjustable forward idler, and means for adjusting said forward idler and said rotary cutter relative to said means for supporting said forward idler to adjust the cutting relationship of said rotary cutter and said cutter element, said forward idler being adjusted in a direction parallel to the axis of rotation thereof.

36. The row crop harvesting apparatus of claim 35 in which the axis of rotation of said forward idler is substantially vertical.

37. The row crop harvesting apparatus of claim 1 further including at least one driving member in operable contact with said conveyor belt, at least one intermediate idler member located between said driving member and said forward idler, said intermediate idler member being in operable supporting relationship with both the forwardly and rearwardly extending portions of said endless conveyor belt, and said rotary cutter being supported by and driven by said forward idler.

38. The row crop harvesting apparatus of claim 37 which includes a plurality of intermediate idler members.

39. The row crop harvesting apparatus of claim 35 also including a rearward driving pulley and a plurality of spaced double lugs extending from the inner surface of said conveyor belt, each of said double lugs comprising a top lug and a bottom lug, said belt being partially supported by said idler and said driving pulley and at least one idler member spaced from said idler and said driving pulley and positioned between top and bottom lugs in operable supporting relationship with said conveyor belt.

40. The row crop harvesting apparatus of claim 39 in which top and bottom lugs are perpendicularly aligned relative to the longitudinal direction of said belt.

41. The row crop harvesting apparatus of claim 39 in which said at least one idler member is positioned between top lugs and bottom lugs in operable supporting relationship with both the forwardly and rearwardly extending portions of said endless conveyor belt.

* * * * *